United States Patent Office 3,516,746
Patented June 23, 1970

3,516,746
CROSS SLIDE SPECTROPHOTOMETER WITH A DIFFUSING ELEMENT BETWEEN SAMPLE CELL AND PHOTOELECTRIC TUBE
Kazuo Shibata, Tokyo, and Hideki Makabe, Kyoto, Japan, assignors to Shimadzu Seisakusho Ltd., Kyoto, Japan, a corporation of Japan
Filed Jan. 25, 1966, Ser. No. 522,858
Claims priority, application Japan, Jan. 28, 1965, 40/4,751
Int. Cl. G01j 3/42
U.S. Cl. 356—96           7 Claims

ABSTRACT OF THE DISCLOSURE

A spectrophotometer with a cross slide holding two containers, the containers having flat light emerging surfaces in planar contact with a diffusion plate, the opposite surface of which is in planar contact with a photoelectric tube window. The containers are filled with a reference fluid and a sample and are compared by passing a monochromatic light through them whereby the contacting surfaces keep the absorption level down resulting in sharply defined spectrum bands.

---

This invention relates to a spectrophotometer in which a sequence of wavelengths are transmitted through an unknown sample to obtain its absorption spectrum, which is indicative of the molecular structure of the sample material.

The absorption spectrum of a translucent sample as measured by spectrophotometers of conventional types is quite different from what it should actually be, with a much higher level of absorbance and with absorption bands considerably distorted or shifted, flattened and obscured. Such a spectrum cannot exactly tell the true characteristics of the sample under measurement.

In photoelectric spectrophotometers, the light transmitted through a sample is received by a photosensor. The conventional arrangement, however, is such that there is a space or distance between the sample and the photosensor so that only a small portion of the light that has hit the particles suspended in the sample solution can reach the photosensor, with quite a large portion of the light having been deviated from the direction toward the photosensor. This necessarily makes it impossible to obtain a spectrum of a translucent sample, with distinct absorption bands.

Accordingly, it is one object of the invention to provide a spectrophotometer which is capable of very accurate measurement of the absorbances of a sample over the whole range of wavelengths, thereby obtaining a spectrum with the lowest level of absorbence and sharply defined absorption bands.

Another object of the invention is to provide a spectrophotometer as aforesaid which is capable of accurately measuring various translucent materials as well as transparent materials.

Still another object of the invention is to provide a spectrophotometer as aforesaid in which the photosensor has a uniform sensitivity all over its sensitive surface, thereby eliminating errors in the measurement which would otherwise be caused.

A further object of the invention is to provide a spectrophotometer as aforesaid in a construction easy to manufacture and maintenance, free of disorders and long in life.

The above and other objects of the invention are accomplished by employing a head-on type of photoelectric tube having a large photosensitive surface, the front window of which is arranged as close as possible to the light emerging surface of a sample cell so that all the light from the latter can be received by the photosensitive surface. In addition, a light diffusing plate is inserted between the light emerging surface of the cell and the front window of the photoelectric tube so that the light from the cell can fall evenly and uniformly on the photosensitive surface of the tube, thereby effecting a uniformly sensitivity of the photosensitive surface and at the same time preventing its local fatigue.

The invention with its features and advantages will be better understood from the following detailed description of a preferred embodiment thereof with reference to the accompanying drawings, wherein:

FIG. 1 schematically shows the relative positions of the sample containers or cells and the photoelectric tube arranged in conventional spectrophotometers;

Figure 1A:
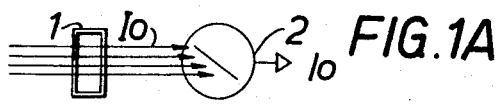
Figure 1B:
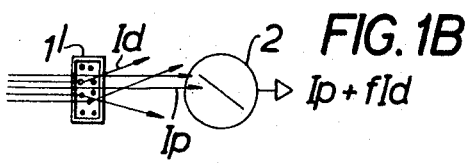

As previously mentioned, in conventional spectrophotometers the sample containers or cells are generally spaced a considerable distance apart from the light-sensitive surface of the photosensor. Such an arrangement is schematically shown in FIGS. 1A and 1B, wherein reference and sample cells and a photoelectric tube are designated by the numerals 1, 1', and 2, respectively. When parallel light is transmitted through the reference cell 1 positioned in alignment with the photoelectric tube 2, there is no problem and all the transmitted light is directed toward and received by the tube 2. On the other hand, when the sample cell 1', containing very small particles in suspension and positioned in alignment with the tube 2, is illuminated with parallel light, part of this light impinges on the particles to be diffused thereby, while the rest will be transmitted through the sample without hitting the particles. The former light will be referred to as "diffuse transmitted light," while the latter, as "parallel transmitted light." The parallel transmitted light will advance straight to be received by the tube 2. Certainly, part of the diffuse transmitted light will reach the photoelectric tube, but much of it will not. This is because many of those light rays that have impinged on the particles in the sample are deviated from the direction toward the tube 2 in the space between the light emerging surface of the cell 1' and the tube 2, only to fail to reach the tube, and also because the commonly used type of tube 2 has a rather small photosensitive surface.

Let the amount of light transmitted through the reference material in the cell 1 and received by the photoelectric tube 2 be $I_o$; the amount of parallel light transmitted through the sample in the cell 1 and received by the tube, $I_p$; and the amount of diffuse light transmitted through the sample and received by the tube, $fI_d$, wherein $f$ is a constant between 0 and 1, depending upon the geometry of the optical system of the spectrophotometer employed, especially upon the distance between the cells and the photoelectric tube, and the area of the photosensitive surface of the tube. Then the absorbence A of the sample will be expressed as follows:

$$A = \log \frac{I_o}{I_p + fI_d}$$

Under the conditions afforded by conventional spectrophotometer the value $f$ is much smaller than 1. This makes the absorbence level considerably higher than it would be when $f$ is 1. Since the values $f$ and $I_o/I_p$ are both practically independent of changes in wavelength, these values tend to mask slight variations of $I_o/I_d$ with wavelength. This makes the spectrum obtained considerably flattened and distorted, and the absorption bands shifted and not so sharply defined as they should actually be. Then what we are measuring by use of conventional spectrophotometers is nothing but quasi-absorbence.

Figure 2A:
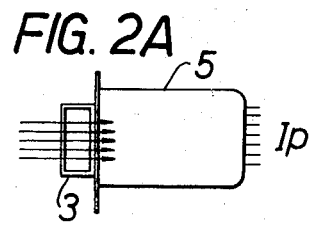
FIG. 2 is a drawing similar to FIG. 1 but showing the arrangement in accordance with the present invention.
Figure 2B:
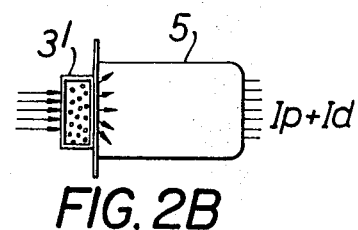

In order to obtain the lowest level of absorbence and the most distinct and sharply defined absorption bands, the value $f$ must be maximal, that is, $f=1$, under which condition all the light beams transmitted through a sample, both parallel and diffused, are captured by the photosensor, and this condition can be brought into existence by the present invention, the principle of which is schematically shown in FIGS. 2A and 2B. As shown, since there is substantially no space between the cell 3 or 3' and the photosensor 5, the photosensitive surface thereof can capture substantially all the light transmitted through the cell 3', both parallel and diffused, thereby effecting the condition that $f=1$ and, consequently $$A = \log \frac{I_o}{I_p + I_d}$$

Figure 3:
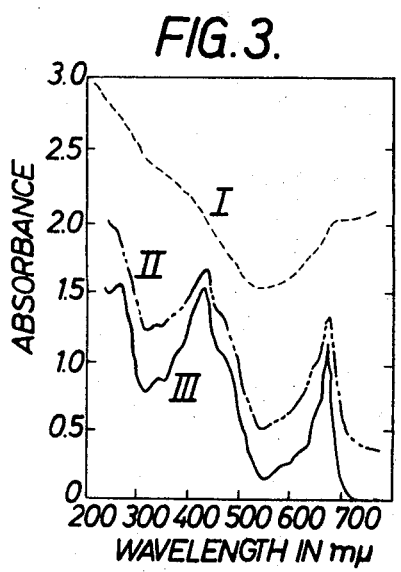
FIG. 3 is a graph showing absorption spectra obtained by use of the spectrophotometer of the invention in contrast with that obtained by use of a conventional spectrophotometer.

FIG. 3 shows a spectrum I of a suspension of Chlorella obtained by a conventional spectrophotometer in contrast with spectra II and III of the same sample obtained by use of the instrument of the invention. It will be seen that the curve I is considerably flattened where sharp absorption bands should appear in the region of 400 to 700 m$\mu$, as shown in spectrum II or III; and that the curve I rises beyond 700 m$\mu$ where it should fall to zero. The difference between the spectra II and III will be referred to later.

Figure 4:
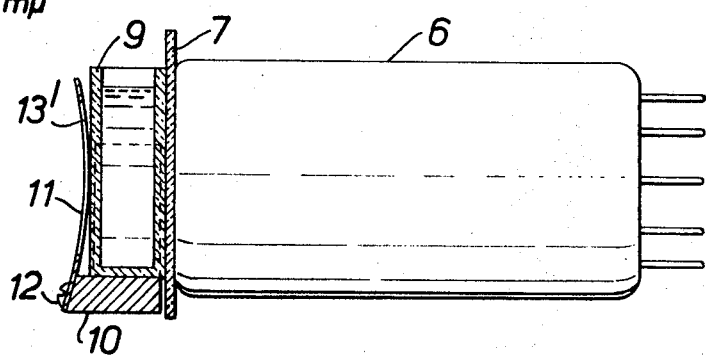
FIG. 4 is a side view partly in vertical section, showing the relative positions, in accordance with the invention, of a head-on type of photoelectric tube, a diffuser plate, a pair of sample containers or and their associated members.
Figure 5:
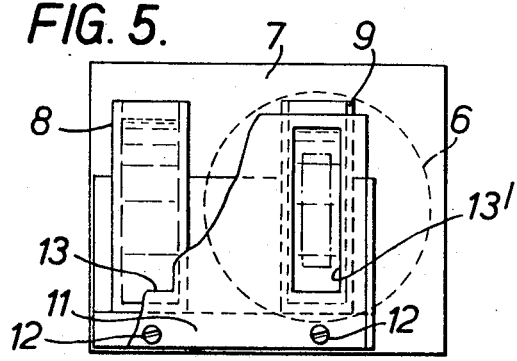
FIG. 5 is a front view, partly broken away, of FIG. 4.

In accordance with the invention, as most clearly shown in FIGS. 4 and 5, a head-on type of photomultiplier tube 6 with a large photosensitive area (not shown) just on the inside surface of the flat front glass of the tube is employed. The tube has its front glass arranged in substantial contact with one surface of a diffuser 7, such as a thin crystal plate having a frosted surface to be brought into contact with the outside surface of the front glass of the photomultiplier tube 6. A pair of sample containers or cells 8 and 9 are mounted in a laterally spaced-apart relationship with each other on a holder 10 which is slidable transversely of the optical axis of the optical system, as will be described hereinafter. The pair of cells 8 and 9 are urged by a resilient plate 11 secured to the cell holder 10 so that the light emerging surfaces of the cells are held in substantial contact with the opposite surface of the diffuser plate 7. A very narrow airgap may be formed between the opposed surfaces of the cells and the diffuser plate. The resilient plate 11 is secured at its lower end to the cell holder 10 as by screws 12 and provided with a pair of windows 13, 13' defining the light entering surfaces of the cells 8 and 9, respectively. The arrangement is such that transverse movement of the cell holder 10 will cause selective alignment of one of the cells with the optical path and the photomultiplier tube 6. A mechanism for such transverse movement of the cell holder will be described later in detail.

It will be seen that the provision of the diffuser plate between the cells and the photomultiplier tube is advantageous in attaining a uniform sensitivity of the tube all over its photosensitive surface, preventing the local fatigue of the surface and providing a physical protection of the front glass of the tube.

Figure 6:
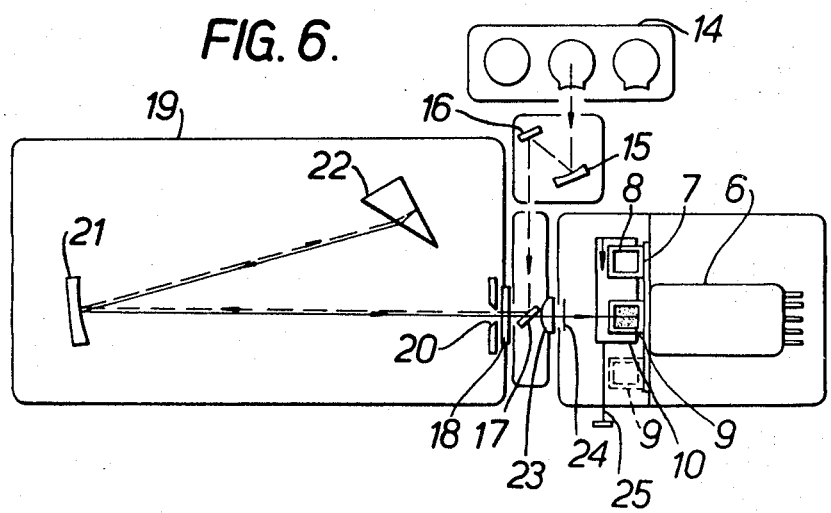
FIG. 6 is a schematic drawing of the whole optical system of the spectrophotometer of the invention.
Figure 7:
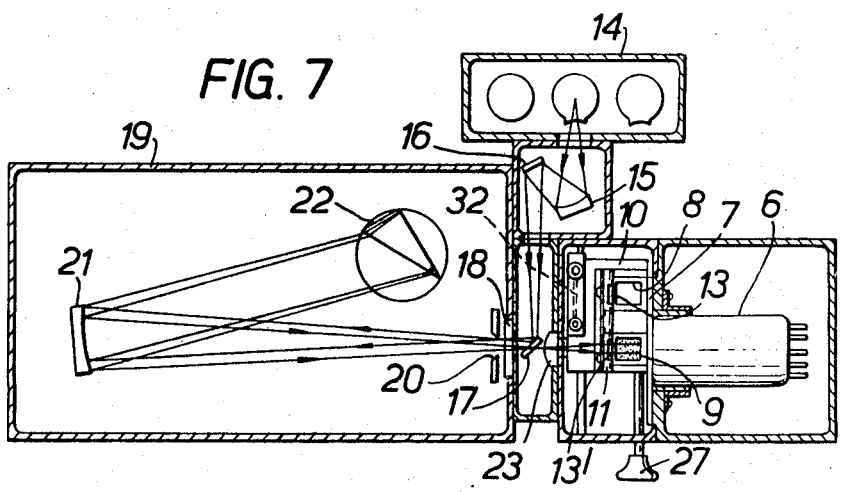
FIG. 7 is a plan view of the spectrophotometer of the invention showing structural details thereof.

Referring now to FIGS. 6 and 7 which show the whole optical system of the device of the invention, rather schematically in FIG. 6 and concretely in FIG. 7, there is provided a light source 14. The light from the source impinges upon a pair of a concave reflecting mirrors 15, a pair of reflectors 16, 17, by which the light is directed to a window 18 formed in the casing wall of a monochromator 19. The light entering the device 19 advances through a slit 20 and impinges on a collimator mirror 21 which renders the rays of light parallel and directs them to a prism 22. The prism disperses the light rays into different wavelengths, among which a selected wavelength is directed back to the collimator mirror 21, again through the slit 20, window 18 and reflector 17 to a collimator lens 23. The parallel monochromatic light rays emerging from the lens 23 then pass through a shutter 24 when opened, the cell 8 or 9 and the diffuser plate 7 and finally enter the photomultiplier tube 6.

Figure 8:
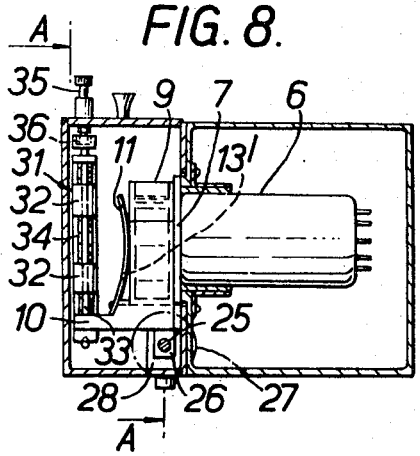
FIG. 8 is a side view of a portion of FIG. 7.
Figure 9:
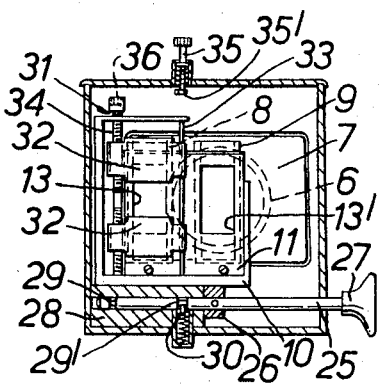
FIG. 9 is a view taken on line A—A of FIG. 8.

In the drawings, the cell 9 containing a sample is shown in alignment with the optical path, so that substantially all the monochromatic light rays at a preselected wavelength transmitted through the sample, both parallel and diffused, that is $(I_p + I_d)$ at the wavelength, are captured by the photomultiplier tube 6, and due to the existence of the diffuser plate 7 those light rays are evenly distributed all over the sensitive surface of the tube. For measurement of $I_o$ the cell holder 10 is transversely moved so as to bring the cell 8 containing a reference solution into alignment with the optical path in place of the sample cell 9. A mechanism for such transverse movement of the cell holder is shown by way of example in FIGS. 8 and 9. A rod 25 secured to the underside of the cell holder 10 as at 26 has its outer end provided with a knob 27 and its inner end portion slidably inserted in a guide member 28 and provided with a pair of circumferential grooves 29 and 29' axially spaced a predetermined distance apart. A spring-biased ball 30 is provided for alternate engagement with the groove 29 or 29'. The distance between the grooves is such that upon pushing in or pulling out of the rod 25, the ball 30 comes to engage with the groove 29 or 29' to position and retain the cell 9 or 8 in front of the photomultiplier tube 6.

It has been experimentally found that many biological samples have no absorption in the region of 700 to 800 m$\mu$. However, the spectrum obtained by use of the above arrangement of the invention shows a level-up of absorbence as shown by the curve II in FIG. 3, which has been caused by reflection on the surface of the sample cell. Correction of such a level-up in order to bring down the curve to the level of curve III can be made by attenuating the amount of light incident on the reference cell 8. For this purpose there is provided an attenuator 31 in front of the cell 8, which comprises a pair of blades 32 supported in a vertically spaced-apart relation on a guide rod 33 and a screw rod 34. The rods 33 and 34 stand on the cell holder 10 and the rod 34 comprises upper and lower half portions oppositely threaded, on each of which portions are threadedly mounted one of the blades 32. It will be seen that rotation of the rod 34 in either direction will cause the two blades to be moved toward or away from each other, thereby narrowing or widening the vertical distance between the two blades. The rotation of the screw rod 35 is made by a spring-biased operating rod 34 having its lower end 35' engageable in a corresponding recess 36 formed on the upper end of the screw rod 34. The engagement of the end 35' in the recess 36 is effected by pressing on the rod 35 when the reference cell 8 is positioned in the optical path and the rods 34 and 35 are axially aligned.

It will be easily understood that if a sample to be measured is put in the container 8 in front of which the attenuator 31 is provided, a level-up of the absorbance curve may be effected. If desired, a similar attenuator may be provided in front of the other container 9, too.

A preferred embodiment of the invention having been illustrated and described, it should be recognized that various modifications and changes thereof can be made. For example, more than two sample containers may be provided, with such necessary structural changes and/or additions to the illustrated embodiment as will be apparent to those skilled in the art.

What we claim is:

1. A spectrophotometer comprising: means for providing a monochromatic light at a sequence of wavelengths; at least two containers each having a light entering surface and a substantially planar light emerging surface, means for selectively positioning one of said containers after the other in the path of said monochromatic light; a light diffusing plate having two substantially planar surfaces, one substantially planar surface disposed in substantial planar contact with the substantially planar light emerging surfaces of said containers when said containers are positioned in said light path; and a head-on type of photoelectric tube having a substantially planar light entering window surface disposed in substantial planar contact with the other substantially planar surface of said light diffusing plate, whereby very accurate absorption spectra can be obtained.

2. The spectrophotometer as defined in claim 1, further including means disposed at the light entering side of at least one of said containers for attenuating said light entering said one container.

3. The spectrophotometer as defined in claim 1, wherein said positioning means comprises means for holding said containers in a laterally spaced-apart relationship, means for moving said holding means transversely of said light path, and means for selectively stopping said transverse movement of said holding means when each of said containers is aligned with said light path.

4. The spectrophotometer as defined in claim 2, wherein said attenuating means comprises a pair of blades arranged edge to edge with a slit therebetween for said light to pass through, and means for moving said blades toward and away from each other, thereby changing the width of said slit and consequently the amount of light passing therethrough.

5. A spectrophotometer comprising: means for providing a monochromatic light at a sequence of wavelengths; at least two containers each having a light entering surface and a substantially planar light emerging surface, a holder for holding said containers in a laterally spaced-apart relationship; a member secured to said holder for moving same transversely of the path of said monochromatic light; means associated with said member for stopping said holder at a different position where each of said containers is aligned with the path of said monochromatic light; a light diffusing plate having two substantially planar surfaces, one substantially planar surface thereof arranged in substantial planar contact with the substantially planar light emerging surfaces of said containers when said containers are positioned in said path of said monochromatic light; and a head-on type of photomultiplier tube aligned with the path of said monochromatic light and having a substantially planar front window with a large photosensitive area on the inside surface thereof, the outside surface of said window being disposed in substantial planar contact with the opposite substantially planar surface of said light diffusing plate, whereby very accurate absorption spectra can be obtained.

6. The spectrophotometer as defined in claim 5, further including an optical attenuator disposed at the light entering side of at least one of said containers.

7. The spectrophotometer as defined in claim 6, wherein said attenuator comprises a pair of blades, means for supporting said blades in an edge-to-edge relation, with a slit therebetween for said light to pass through, and means for moving said blades toward and away from each other, thereby changing the width of said slit and consequently the amount of light passing therethrough.

References Cited

UNITED STATES PATENTS

| 3,151,769 | 12/1964 | McPherson. | |
| 3,215,849 | 11/1965 | Golden | 250—218 |
| 3,260,850 | 7/1966 | Bunge et al. | 250—228 |

OTHER REFERENCES

"Colorimetry," A. A. Shurkus, Radio News, June 1944, pp. 25–27, 56, 58, 60, and 71.

RONALD L. WIBERT, Primary Examiner

V. P. McGRAW, Assistant Examiner

U.S. Cl. X.R.

250—226; 356—180